United States Patent Office 3,252,987
Patented May 24, 1966

3,252,987
TETRAZOLIUM COMPOUND ELECTROPLATING LEVELING AGENT AND METHOD OF PREPARATION
William G. Hart, Rochester, N.Y., assignor to Eastman Kodak Company, Rochester, N.Y., a corporation of New Jersey
No Drawing. Filed Mar. 9, 1964, Ser. No. 350,562
10 Claims. (Cl. 260—299)

This invention relates to an electroplating leveling agent and to a method for preparing and isolating the agent. More specifically, the invention relates to a novel complex mercury tetrazolium compound which displays marked results when used in conjunction with conventional components in electroplating baths, and a method of preparing the compound in a non-aqueous solution.

Diphenylthiocarbazone has long been used as an analytical reagent for the identification of metals in colorimetry. It has been used for the identification of mercury in the manner described by E. Sandell "Colorimetric Detrm. of Traces of Metals," 3rd ed., pp. 139–176, 621–639, and
F. Welcher "Org. Anal. Reagents," vol. III, pp. 463 thru 550 (particularly 468–69, 511–516).

According to the prior art, a bis chelate is obtained when diphenylthiocarbazone is reacted with mercury II chloride in an acid aqueous solution. The reaction as reported by the prior art yields only the bis chelate.

It is an object of this invention to provide a compound having desirable properties as an electroplating bath additive.

Another object of this invention is to provide a reaction process for producing the new compound.

Yet another object is to provide a process for separating and isolating the new compound.

According to the present invention, it has been found that a new compound can be produced by refluxing mercury II chloride and diphenylthiocarbazone in a non-aqueous solvent system. A particularly favorable solvent system is one consisting of ethanol and benzene. While differing ratios of mercury II chloride and diphenylthiocarbazone can be employed, the yield of the desired product is greatly improved when a molar ratio of about 1:2 respectively of these components is employed. The desired reaction, which appears to utilize either an oxidative or disproportionation type mechanism, proceeds during refluxing with stirring and is substantially complete after about 16 hours, though the time is not critical. An approximately equal proportion of previously known bis chelate is formed with the desirable new product.

Decidedly improved plating characteristics are produced by the new compound when it is added to electroplating baths in small quantities. The newly discovered compound permits smooth even plating of irregularly shaped objects and greatly minimizes the undesirable results due to variations in current density. It improves greatly plating coverage of minute irregularities.

Pure samples of the desired product can be isolated by solvent extraction of the bis chelate from the initial reaction product leaving the esesntially pure new compound. Suitable solvents for the extraction step include liquid aromatic benzenoid hydrocarbons, chlorinated aromatic benzenoid hydrocarbons, chlorinated aliphatic hydrocarbons, aliphatic esters, aliphatic ketones, and cyclic ethers. Benzene, toluene, xylene, chlorobenzene, chloroform, carbon tetrachloride, dichloroethane, ethyl acetate, acetone, dioxane and tetrahydrofuran have proved to be particularly desirable solvents. Methyl alcohol, ethyl alcohol, butyl alcohol, ethyl ether, petroleum ether, high boiling (100–115° C.) ligroine, cyclohexane, pyridine, 1-methyl-2-pyrrolidinone, nitrobenzene, nitroethane, acetonitrile, dimethylformamide, water, dimethylsulfoxide, and acetic acid are inoperable as extraction solvents.

The newly discovered compound has the empirical formula $C_{13}H_{10}Cl_2HgN_4S$. On the basis of the best available information, the name 5-chloromercurithio-2,3-diphenyl-2H-tetrazolium chloride has been assigned to the compound as has the following structure:

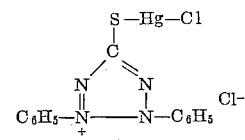

Analytical determinations indicate that the new compound probably has the indicated tetrazolium type ring structure. However, the structural determination is not conclusive and the above assignment of name and structure is, of course, subject to confirmation.

The invention will be more readily understood upon consideration of the following examples.

Example I

A mixture of mercury II chloride and 6 parts of ethanol was added to a suspension of diphenylthiocarbazone in 8 parts of benzene. The reactants were present in a 1:2 molar ratio of mercury II chloride to diphenylthiocarbazone. After 16 hours of refluxing with stirring, the mixture was cooled and a solid separated by filtration. The mother liquors were washed out and the product dried overnight. A crude product of about 50% plus or minus 10% of the new tetrazolium compound was obtained in the yield of about 70%.

Example II

The dried crude reaction product from Example I was stirred into 10 parts of hot chloroform and filtered hot. The solid was washed with chloroform until the washes were pale amber in color. After drying overnight a recovery of approximately 50% of a pink-gray solid was obtained having a melting point of 216–218° C. The solid proved to be the tetrazolium compound.

Example III

The dried crude reaction product from Example I was stirred into hot benzene and filtered hot. The solid was washed with benzene and dried overnight. The solid proved to be essentially pure tetrazolium compound.

Example IV

The crude product from Example I was treated as set forth in Example II using xylene as the solvent. An essentially pure tetrazolium compound was obtained in a recovery of approximately 50% from the crude product.

Example V

The crude product from Example I was treated as set forth in Example II using chlorobenzene as the solvent. An essentially pure tetrazolium compound was obtained in a recovery of approximately 50% from the crude product.

Example VI

The crude product from Example I was treated as set forth in Example II using carbon tetrachloride as the solvent. An essentially pure tetrazolium compound was obtained in a recovery of approximately 50% from the crude product.

Example VII

The crude product from Example I was treated as set forth in Example II using dichloroethane as the solvent. An essentially pure tetrazolium compound was obtained in a recovery of approximately 50% from the crude product.

Example VIII

The crude product from Example I was treated as set forth in Example II using ethyl acetate as the solvent. An essentially pure tetrazolium compound was obtained in a recovery of approximately 50% from the crude product.

Example IX

The crude product from Example I was treated as set forth in Example II using acetone as the solvent. An essentially pure tetrazolium compound was obtained in a recovery of approximately 50% from the crude product.

Example X

The crude product from Example I was treated as set forth in Example II using dioxane as the solvent. An essentially pure tetrazolium compound was obtained in a recovery of approximately 50% from the crude product.

Example XI

The crude product from Example I was treated as set forth in Example II using tetrahydrofuran as the solvent. An essentially pure tetrazolium compound was obtained in a recovery of approximately 50% from the crude product.

The above-described and illustrated solvents can be employed either singly or serially; that is, the initial extraction can utilize one solvent and the following washes can employ yet other solvents. Those skilled in the art will readily recognize the most advantageous manner of carrying out this extraction step.

Example XII 14 parts of distilled water was stirred into 1 part of mercury II chloride in 7.5 parts of ethanol. To this solution 2 molecular equivalents of diphenylthiocarbazone was added. Concentrated CP hydrochloric acid was added in the amount of 0.15 parts. The mixture was refluxed until a homogeneous deep red mixture was obtained. After cooling and filtering, a red product was thoroughly washed with water and ethanol and dried in a hot, 50–60° C., air oven. A brilliant red solid of the bis chelate at the melting point of 218–218.5° C., was obtained in a 95% plus yield. No 5-chloromercurithio-2,3-diphenyl-2H-tetrazolium chloride was found. Thus the newly discovered tetrazolium compound is not obtained under the prior reaction conditions yielding the bis chelate.

It is apparent from the above description and examples that a new compound has been discovered which can be conveniently prepared with the use of the disclosed reaction process. Also, though the crude product of the reaction process is useful as an electroplating leveling agent, the functional component, i.e. the 5-chloromercurithio-2,3-diphenol-2H-tetrazolium chloride, can be advantageously separated and isolated by the disclosed extraction process.

The invention has been described in detail with particular reference to preferred embodiments thereof, but it will be understood that variations and modifications can be effected within the spirit and scope of the invention as described hereinabove and as defined in the appended claims.

I claim:

1. A new composition of matter having the assigned name 5-chloromercurithio-2,3-diphenyl - 2H - tetrazolium chloride.

2. A method of preparing an electroplating leveling agent comprising reacting diphenylthiocarbazone with mercury II chloride in a non-aqueous solvent system and separating 5-chloromercurithio - 2,3 - diphenyl-2H-tetrazolium chloride therefrom.

3. A method as set forth in claim 2 in which the non-aqueous solvent comprises ethanol and benzene.

4. A method as set forth in claim 3 in which the ethanol and benzene are present in a 3:4 volume ratio, respectively.

5. A method as set forth in claim 2 in which the diphenylthiocarbazone and mercury II chloride are present in a molar rato of 2:1, respectively.

6. A method as set forth in claim 2 in which the reaction is carried out under reflux conditions.

7. A method for preparing an electroplating leveling agent comprising reacting diphenylthiocarbazone with mercury II chloride in a refluxing non-aqueous ethanol-benzene solvent system and separating a solid from the solvent by cooling.

8. A method as set forth in claim 7 in which the separated solid is washed with a liquid solvent from the group consisting of aromatic benzenoid hydrocarbons, chlorinated aromatic benzenoid hydrocarbons, chlorinated aliphatic hydrocarbons, esters, ketones and cyclic ethers to remove undesirable products.

9. A method of separating the compound having the structural formula

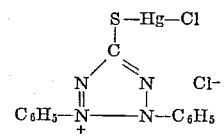

from the reaction product of diphenylthiocarbazone and mercury II chloride in a non-aqueous solvent comprising stirring the reaction product in a liquid solvent from the group consisting of aromatic benzenoid hydrocarbons, chlorinated aromatic benzenoid hydrocarbons, chlorinated aliphatic hydrocarbons, esters, ketones and cyclic ethers, filtering the resulting suspension, and washing the remaining solid with the solvent.

10. A method as set forth in claim 9 in which the reaction product is stirred into a hot solvent.

No references cited.

HENRY R. JILES, *Acting Primary Examiner.*

R. J. GALLAGHER, *Assistant Examiner.*